United States Patent [19]

Grosjean

[11] Patent Number: 4,680,494

[45] Date of Patent: Jul. 14, 1987

[54] MULTIPHASE MOTOR WITH FACIALLY MAGNETIZED ROTOR HAVING N/2 PAIRS OF POLES PER FACE

[76] Inventor: Michel Grosjean, 1, rue des Narcisses, CH-2504 Bienne, Switzerland

[21] Appl. No.: 720,409

[22] PCT Filed: Jul. 30, 1984

[86] PCT No.: PCT/CH84/00119

§ 371 Date: Mar. 28, 1985

§ 102(e) Date: Mar. 28, 1985

[87] PCT Pub. No.: WO85/00705

PCT Pub. Date: Feb. 14, 1985

[30] Foreign Application Priority Data

Jul. 28, 1983 [CH] Switzerland .................. 4128/83

[51] Int. Cl.⁴ ............................................. H02H 37/00
[52] U.S. Cl. ................................. 310/156; 310/49 R; 310/257
[58] Field of Search ............. 310/40 MM, 49 R, 156, 310/162, 163, 164, 213, 254, 257

[56] References Cited

U.S. PATENT DOCUMENTS

| | | | |
|---|---|---|---|
| 3,989,967 | 11/1976 | Kikuyama et al. | 310/164 |
| 4,075,540 | 2/1978 | Torisawa. | |
| 4,207,483 | 6/1980 | Baer | 310/49 R |
| 4,336,471 | 6/1982 | Plancon | 310/49 R |
| 4,455,499 | 6/1984 | Sudler | 310/49 R |
| 4,558,244 | 12/1985 | Nikaido et al. | 310/49 R |

FOREIGN PATENT DOCUMENTS

| | | |
|---|---|---|
| 2938771 | 4/1981 | Fed. Rep. of Germany . |
| 2938771A | 4/1981 | Fed. Rep. of Germany . |
| 1238445 | 7/1960 | France . |
| 74145 | 11/1960 | France . |
| 2209246 | 6/1974 | France . |
| 2283576 | 3/1976 | France . |
| 2417880 | 9/1979 | France . |
| 2435150 | 3/1980 | France . |
| 2458170 | 12/1980 | France . |
| 1238445 | 12/1981 | France . |
| 2518844 | 6/1982 | France . |
| 1531314 | 11/1978 | United Kingdom . |
| 1537048 | 12/1978 | United Kingdom . |
| 2014800A | 8/1979 | United Kingdom . |
| 1586056 | 3/1981 | United Kingdom . |

Primary Examiner—Patrick R. Salce
Assistant Examiner—D. L. Rebsch
Attorney, Agent, or Firm—Parkhurst & Oliff

[57] ABSTRACT

A multiphase motor including a facially magnetized rotor having N/2 pairs of poles per face. The motor also includes a stator for each phase. Each stator has a first and second pair of polar pieces, each pair of polar pieces including internal and external substantially coplanar polar pieces interpositioned one within the other. The internal stator pieces of one phase of the motor are constructed with fractional stator poles, whereas all remaining stator poles are full. Each phase includes a core piece which has a first end connected to the internal polar pieces, and a second end connected to external polar pieces. Each core of each phase has a coil wound thereon. A motor constructed according to the invention prevents loss no magnetic flux from the magnetized rotor. This allows the motor to be highly energy efficient, and compact in size.

15 Claims, 8 Drawing Figures

MULTIPHASE MOTOR WITH FACIALLY MAGNETIZED ROTOR HAVING N/2 PAIRS OF POLES PER FACE

This invention relates to multiphase motors with facially magnetized rotors having on each one of its two faces N/2 pairs of poles.

According to the rotor magnetization it is possible to define several types of motors.

A first type is that for which the rotor has N pairs of poles, these pairs being defined, for instance, by magnetization axes which are parallel to the axis of rotation of the rotor, so that the latter has N poles on each one of its two faces. This rotor is referred to as axially magnetized.

A second type is that for which the rotor has, on each one of its two faces, N/2 pairs of poles, these pairs being defined, for instance, by magnetization curves which are contained in planes parallel to the axis of rotation of the rotor, so that the latter also has N poles on each one of its two faces. This rotor is referred to as facially magnetized.

The motor according to the invention essentially belongs to this second type.

A principal object of the invention is to provide a multiphase motor having optimum efficiency by using existing materials, and which can be manufactured by industrial processes, the number of phases thereof as well as the basic range of powers being very extensive, without modifying the motor concept. Another object of the invention is to provide a multiphase motor which can easily be adapted to the stepping mode.

The field of application of the motor according to the present invention is thus very large. This motor can be used, for example, in driving systems for office automation, robots, aeronautical and space industry, photographic innstallations, and time-keepers. More generally, the motor according to the present invention is suitable to all the systems using digital techniques, and, more particularly, to all those wherein size, efficiency, power and speed are determining criteria.

One preferred embodiment of the motor according to the invention and two variants are represented diagrammatically and simply by way of example in the drawings in which.

The motor represented has a rotor 1, each one of the two faces of which has a number N of poles equal to eight. The number m of the phases of this motor is equal to two. Moreover, the phase shift of these two phases is equal to $2\pi/Nm$.

Figure 1:
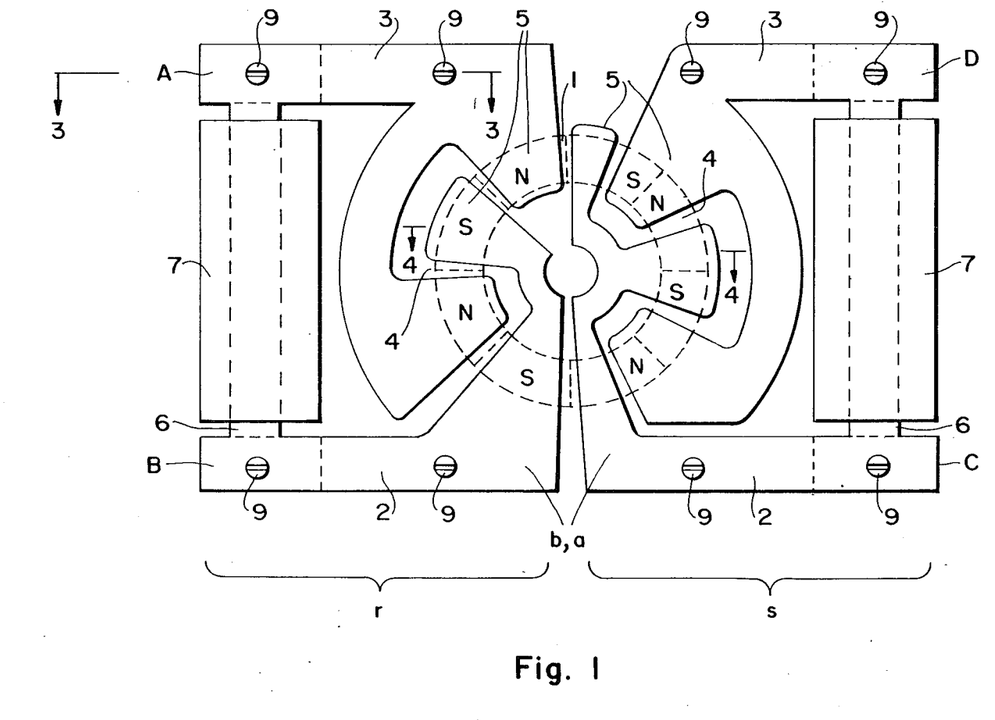
FIG. 1 is a view of a motor according to the present invention in the direction of the axis of rotation of the rotor.
Figure 2:
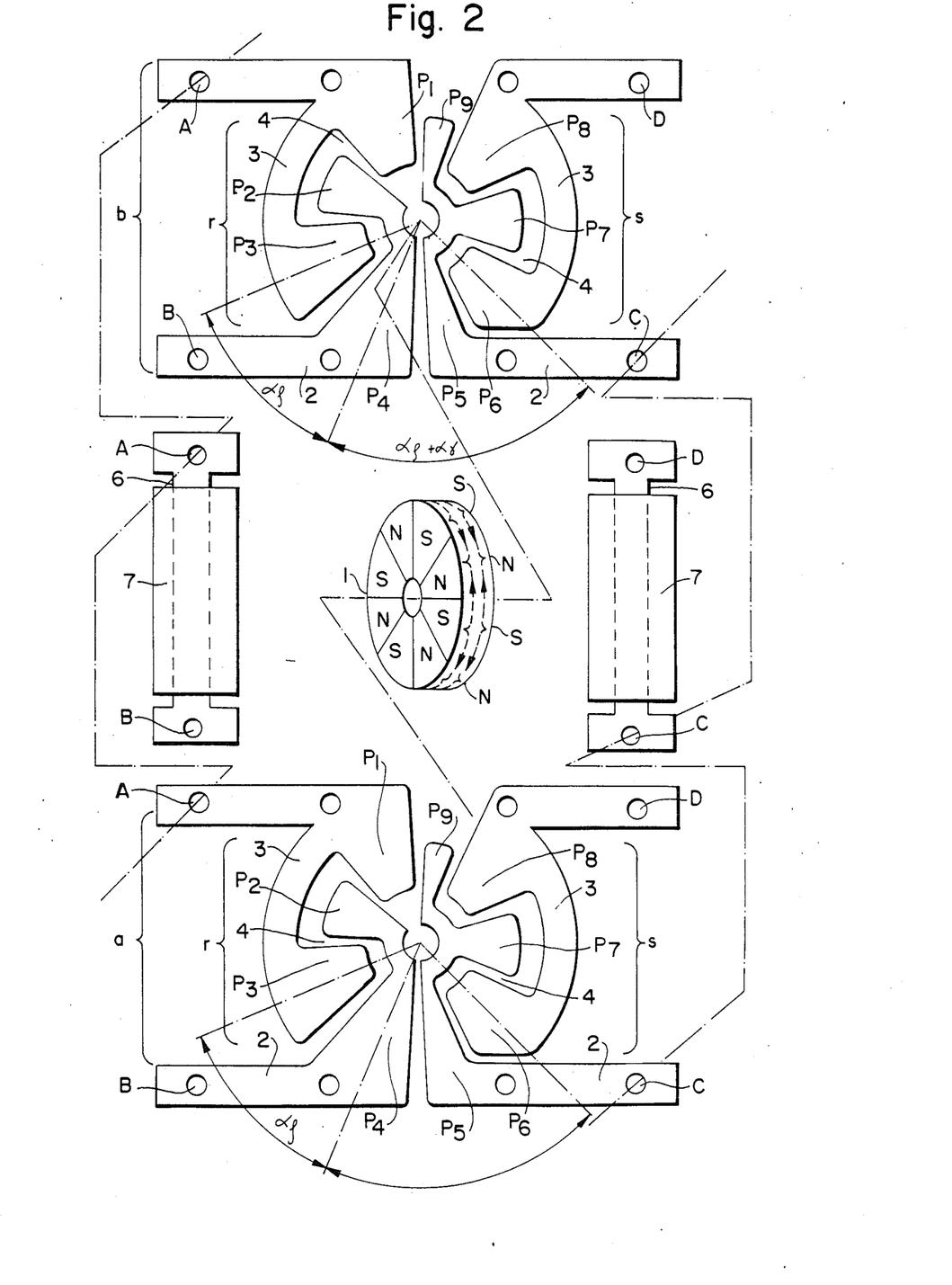
FIG. 2 is an exploded view of the invention to illustrate the structure.

The structure of this motor is particularly illustrated in FIG. 2, and FIG. 1.

Rotor 1 is of ferromagnetic material such as samarium-cobalt, the coercive force of which is high and the specific mass small. Each one of its two faces has N/2 pairs of poles. On each face, these poles are regularly distributed around the axis of rotation of the rotor and they have alternate opposite polarities. Moreover, the poles of one face are located opposite the poles with the same polarity on the other face.

A stator is mounted opposite each face of the rotor: a first one a and a second one b. The stators a, b form two phases r and s. Each phase r, s comprises two polar pieces 2, 3 being coplanar with each one of the two stators a, b. The two polar pieces 2, 3 of each phase r, s of stator a have the same shape, respectively, as the two polar pieces 2, 3 of each one of the two phases r, s of stator b. Moreover, in the view of FIG. 1, the polar pieces 2, 3 of stator b are superimposed over the polar pieces 2, 3 with the same shape of stator a.

The two coplanar polar pieces of each one of the two phases r, s of each stator a, b are interpositioned, one in the other, piece 2 being within piece 3. Furthermore, these two pieces 2, 3 are separated from one another, by a sinuous air-gap 4. Each phase thus has two pairs of polar pieces having the same shape and being opposite to one another and two pairs of coplanar polar pieces interpositioned in one another.

The polar pieces are of ferromagnetic material having a small coercive force and a high saturation induction. They have nine poles 5 (FIG. 1) which are designated by $p_1, p_2, \ldots, p_9$ in FIG. 2 to facilitate the explanations.

This Figure shows that poles $p_1$, $p_3$ of polar pieces 3 of phase r of stators a, b, poles $p_2$, $p_4$ of polar pieces 2 of this same phase r of stators a, b, poles $p_6$, $p_8$ of polar pieces 3 of phase s of stators a, b and pole $p_7$ of polar pieces 2 of this phase s of stators a, b have the same angular arc, respectively. These poles are called full, whereas the poles $p_5$ and $p_9$ of polar pieces 2 of phase s of stators a, b are called fractional. The sum of the angular arc of these two fractional poles is at least approximately equal to the angular arcs of a full pole.

With the general case of a motor having m phases and the rotor of which has N poles, the poles of polar pieces of m-1 phases and those of the two polar pieces opposite one another, of stators a, b of the mth phase are full; they are N/2m in number per molar piece and are spaced apart by an angular interval at least approximately equal to twice that between the adjacent poles of each rotor face. Regarding the poles of the two remaining polar pieces, there are (N/2m)−1 poles per polar piece which are full, whereas the m remaining poles per polar piece are fractional, the sum of their angular arcs being at least approximately equal to the angular extension of a full pole.

With the embodiment represented, phases r, s are offset with respect to one another, by an angle of $\alpha\gamma$ of 22.5°. In the general case of a motor having m phases and the rotor of which has N poles per face, $\alpha\gamma = 2\pi/Nm$. The angular extension of each fractional pole is at least approximately equal to 1/m times that of a full pole.

The setoff $\alpha\gamma$ can be made different from $2\pi/Nm$. In this case, the sum of the angular arcs of the fractional poles remains at least approximately equal to the angular arc of a full pole, but these fractional poles no longer have the same angular arc compared with each other.

In each phase, each polar piece of stator a is magnetically connected to the polar piece of stator b, lying directly opposite across rotor 1. These magnetic connections are such that for each phase, the two outer polar pieces 3 are connected to one end of a core 6, the other end of which is connected to the two inner polar pieces 2 of the same phase. Thus for phase r, the two outer polar pieces 3 are connected to the end A of core 6 of this phase, the other end B of which is connected to the two inner polar pieces 2 of this same phase. Similarly, for phase s, the two outer polar pieces 3 are connected to end D of core 6 of this phase, the other end C of which is connected to the inner polar pieces 2.

Core 6 of each phase is of a ferromagnetic material having a small coercitive force and a high saturation induction. A coil 7 is wound around the core of each phase. The whole is assembled in the manner illustrated by FIG. 3 which is a section taken from FIG. 1.

Figure 3:
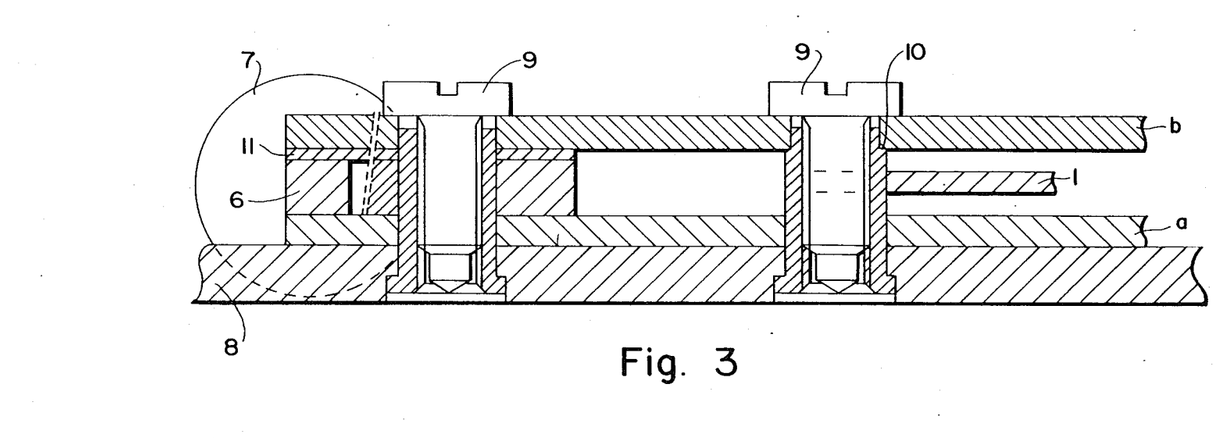
FIG. 3 is a sectional view illustrating how the stators are positionned.

Referring to FIGS. 1 and 3, the stator a lies against a piece of non ferromagnetic material 8. With each phase, the polar pieces 2, 3 of the respective stators a, b are positionned by four threaded feet 9. Two of these feet are provided with a shoulder 10, against which the polar pieces of stator b lies. Two spacers 11 of soft ferromagnetic material are inserted in the space between each core end and each polar piece of stator b.

The disclosed device ensures, on the one hand, a proper positionning of the polar pieces in their planes due to the threaded feet, and, on the other hand, the exact positionning in height of these polar pieces, due to the shoulders 10 and the distance-pieces 11.

Figure 4:
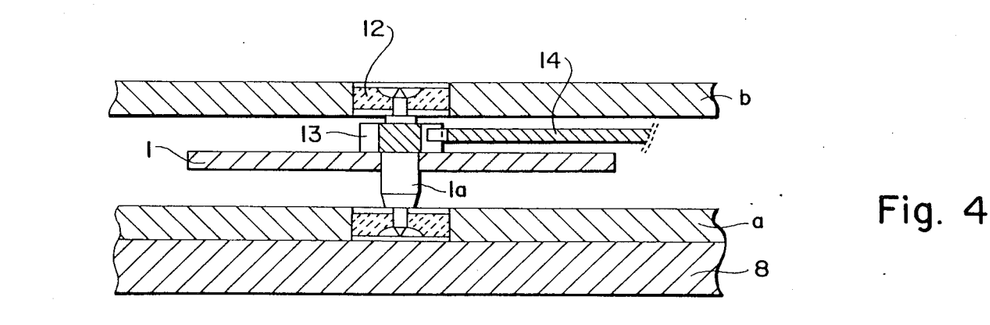
FIG. 4 is a sectional view illustrating the rotor assembly.

Rotor 1 is mounted in the manner illustrated by FIG. 4 which also is a section taken from FIG. 1. It is journaled in bearings 12 having a small contact friction. These bearings are preferably made out of ruby. A pinion 13 is integral with the rotor shaft 1a to transmit the rotations thereof to a first gear 14 of a train (not shown).

Figure 5:
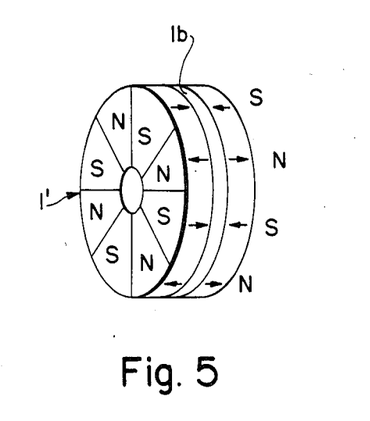
FIG. 5 is a perspective view of the rotor of the first variant.

With the variant of FIG. 5 the rotor is made in two parts separated by a disk 1b of soft ferromagnetic material. Each part of this rotor has N magnetization axes of alternate opposite directions. These magnetization axes are parallel to the axis of rotation of the rotor and they are regularly distributed around the latter. The poles of the outer face of one of the rotor parts are aligned with those of the same polarity on the outer face of the other rotor part.

Figure 6:
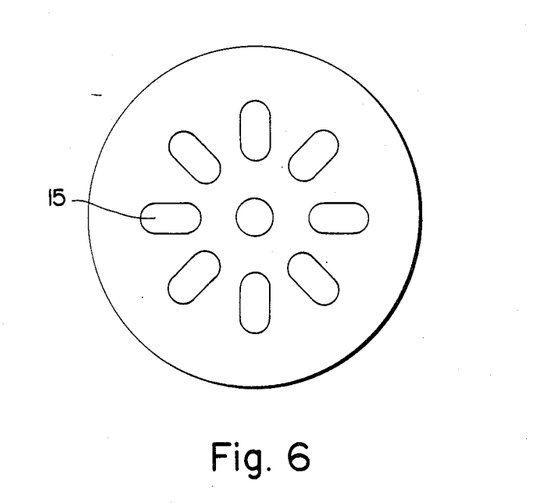
FIG. 6 is a plan view of a piece of the second variant.

With the variant of FIG. 6 the motor comprises a soft ferromagnetic fixed disk mounted in lieu of one stator. This disk is provided with apertures 15 which are arranged so as to produce a positionning torque.

Figure 7:
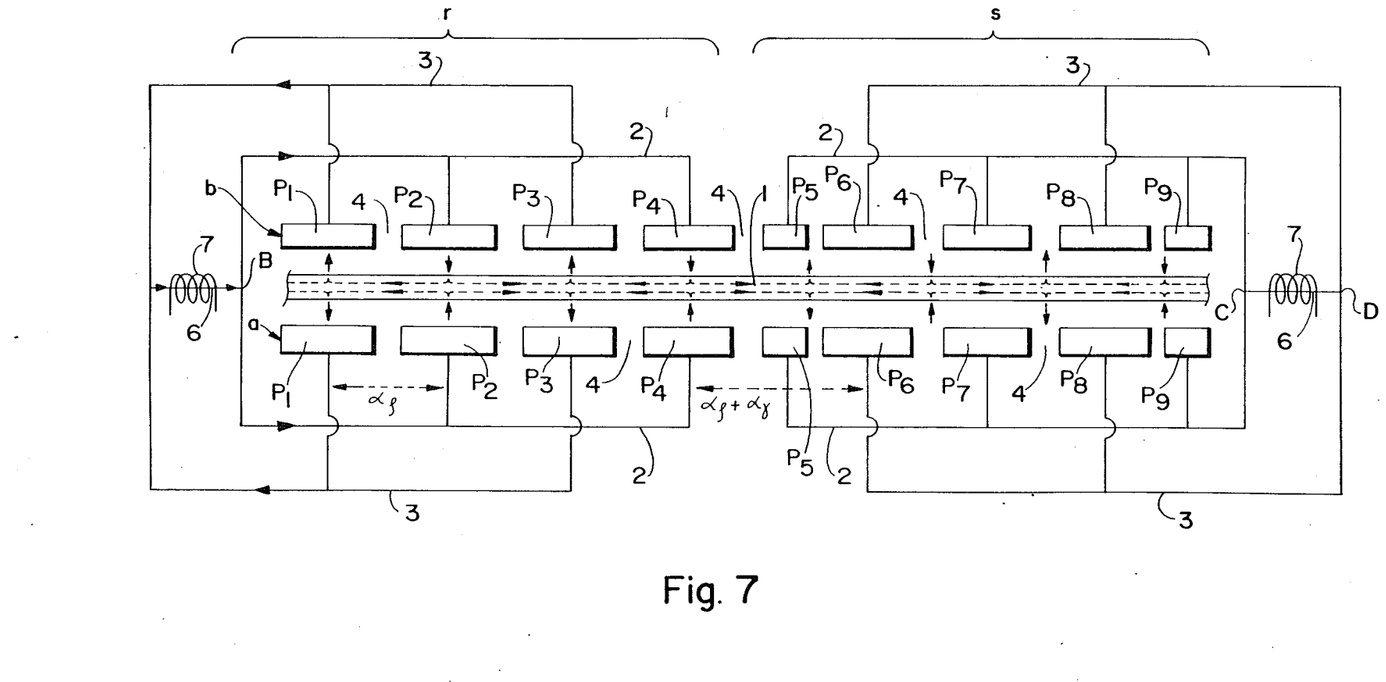
FIGS. 7 and 8 are linear unrolled views which illustrate the mode of operation of the present invention.
Figure 8:
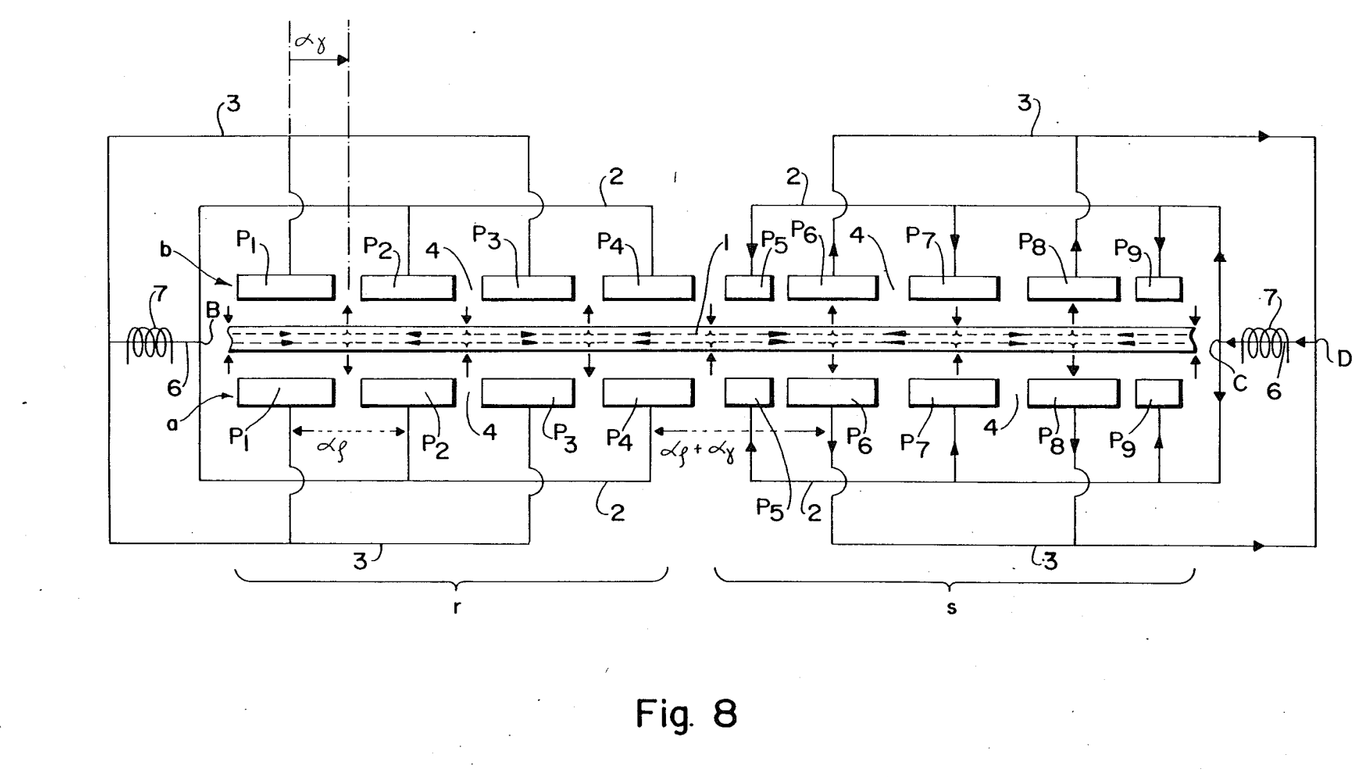

FIGS. 7 and 8 illustrate the operation of the motor. They are linear developed views thereof. More particularly they are diagrammatic crosssections of the motor previously unrolled in linear manner. The offset of the phases r, s is 22.5°.

FIG. 8 shows the state of the motor when the rotor has turned through 22.5° with respect to that represented in FIG. 7, thus in the general case through an angle $\alpha\gamma = 2\pi/Nm$.

In order to facilitate understanding the operation of the motor represented, the manner of determining the characteristic called mutual torque is first explained. This mutual torque is that due to the interaction between the fluxes of the magnetized rotor and those of the coils.

In the position of FIG. 7 the pairs of poles of the rotor 1 are exactly opposite poles $p_1$, $p_2$, $p_3$ and $p_4$ of phase r of stators a, b. This Figure shows that the fluxes coming out of the poles of the rotor face directed toward the stator a are received by the poles $p_1$ and $p_3$ of the polar piece 3 of stator a, wherefrom they are conveyed to core 6 of phase r, through which they flow from A to B. They are then closed after having passed poles $p_2$ and $p_4$ of polar piece 2 of stator a. Regarding the fluxes issuing from the rotor face directed toward stator b, they are received by poles $p_1$ and $p_3$ of polar piece 3 of stator b, and then conveyed to core 6 of phase r, through which they also flow from A to B before getting closed after having passed through poles $p_2$ and $p_4$ of polar piece 2 of stator b. In the rotor position considered, the rotor flux through core 6 of phase r is thus maximum.

Upon turning the rotor from the position shown in FIG. 7 through an angle $\alpha_{92}$ equal to $2\pi/N$, it is easy to see that the flux through core 6 of phase r is also maximum, but in the opposite direction, i.e. it flows through this core from B to A. There is thus a flux reversal of the rotor in core 6 of phase r every time the rotor turns through an angle equal to $2\pi/N$, thus through 45° in the example represented.

When the coil of phase r is energized, there results therefrom, according to the laws of electromechanics, an interaction torque between the coil and the magnetized rotor (the so-called mutual torque) the period of which is equal to $4\pi/N$, and the neutral positions of which correspond to the rotor positions in which the pairs of poles of the latter are exactly opposite the poles of the polar pieces of this phase r of the stators.

Regarding poles $p_5$, $p_6$, $p_7$, $p_8$ and $p_9$ of phase s, between which are the pairs of the rotor poles in FIG. 7, it is easy to see that this phase s also has a mutual torque with a period of $4\pi/N$, but offset with respect to the mutual torque of phase r through an angle $\alpha\gamma = 2\pi/Nm$, thus through 22.5° in the example represented.

The rotor position in which its flux through core 6 of phase s is maximum is that of FIG. 8. The two fractional poles $p_5$ and $p_9$, each collects from each rotor face a flux equal to $1/m$ times the flux collected by a full pole, thus a flux equal to ½ time that of a full pole in the example represented.

The remarks made herebove an offset of the phases different from $2\pi/Nm$ are here applicable too.

The motor behaviour with the indicated mutual torques, when the coils are energized, is known and will not be disclosed.

The two-phase motor represented having a rotor with eight poles per face is obviously not the only possible manner of embodying the motor according to the invention. The number N of poles per rotor face and that m of the phases need only satisfy the relation $m = N/2n$ with n integer. Table I indicates the possible configurations of the motor according to the invention.

TABLE I

| m | n | N |
|---|---|---|
| 2 | 1 | 4 |
| two-phase | 2 | 8 |
|  | 3 | 12 |
|  | 4 | 16 |
|  | ... | ... |
|  | ... | ... |
| 3 | 1 | 6 |
| three-phase | 2 | 12 |
|  | 3 | 18 |
|  | 4 | 24 |
|  | ... | ... |
|  | ... | ... |
| 4 | 1 | 8 |
| four-phase | 2 | 16 |

TABLE I-continued

| m | n | N |
|---|---|---|
|   | 3 | 24 |
|   | 4 | 32 |
|   | ... | ... |
|   | ... | ... |
| ... | ... | ... |

The rotor 1' of the variant represented in FIG. 5 comprises two magnetized parts. Unlike the rotor of the embodiment disclosed hereabove, the magnetization of these two parts is axial, accordingly easy to produce, and a soft ferromagnetic disk 1b is fixed between them. Since the poles of these two parts, which are opposite one another, have the same polarity, the operation of the motor according to that variant is the same as that of the embodiment disclosed hereabove.

Another variant (not shown) of the motor according to the invention consists in an identical offset of the poles both of one rotor face and of the stator facing that rotor face, with respect to the poles of the other rotor face and of the stator facing that other rotor face. In this case too, the operation of the motor is the same as that of the embodiment disclosed hereabove.

It is also possible in further variants (also not shown) to provide two cores per phase instead of a single one, the one interconnecting the two coplanar polar pieces of one stator, and the other one, those of the other stator. The number of phases could be doubled in that way, for instance by offsetting the poles of one rotor face with respect to those of the other face or one stator with respect to the other one. In each case, instead of one rotor position in which a group of its poles being opposite to eachother is opposite poles of one stator phase, there would be, instead, a first rotor position in which only the poles of the group located on one rotor face would be opposite poles of said phase of one stator, and a second rotor position in which the poles of the group located on the other rotor face, which would be opposite poles of said phase of the other stator. This allows doubling the motor phases without having to modify the shape of the pieces composing the motor. The two displacements mentioned of the rotor and of the stator poles could even be made conjointly. The two displacements could, of course, be identical as in a variant disclosed hereabove with the difference that there would be, in the last case, two cores per phase instead of a single one. Each one of these cores would however be monophase and the motor would thus only have m phases. According to the function assigned to some phases, it could finally be advantageous to carry out different displacements, on the one hand, of the phases of one stator with respect to the other, and, on the other hand, of those of the other stator.

The motor according to the invention would still operate if one stator were removed. In this case, the rotor could have N/2 pairs of poles only on its face facing the remaining stator. Since the flux in the cores would be reduced by half, the efficiency of the motor would of course be less.

One stator could also be replaced by a soft ferromagnetic disk in order to overbalance the attraction between the rotor and the remaining stator. FIG. 6 shows such a disk which is provided with apertures 15 in order to produce a positioning torque. These apertures are equal in number to that of the poles of one rotor face and they are arranged along a circular crown concentric to the rotor, in which they are regularly distributed. In this case, the period of the positioning torque is equal to $2\pi/N$. It would, however, also be possible to produce a positioning torque having a period $4\pi/N$ by omitting every other aperture 15. A phase displacement between the positioning torque and the mutual torques could also be produced by displacing the apertures 15 with respect to the radial segments of the sinuous air-gap 4 of the stator. Such a phase displacement could also be produced by displacing the poles of one rotor face with respect to those of the other face, the apertures 15 being then symmetrically located with respect to the radial segments of the sinuous air-gap of the stator.

In all the embodiments comprising a stator opposite each rotor face, positioning the stators is ensured in the manner disclosed in reference to FIG. 3.

Regarding the efficiency of the motor according to the invention and without going into the details of theory, those skilled in the art will understand that it is optimum.

At first the fluxes of all the pairs of poles are conveyed in the same direction through each coiled core because of the disclosed interposition of polar pieces 2, 3, of the magnetic connection provided between the two stators and of the provision of full and fractional poles. There is, indeed, no pair of poles of the rotor, the flux of which would be lost, i.e. would not get closed through the cores and would not contribute in additive manner to the mutual flux. This is a first necessary condition to obtain an optimum efficiency.

Moreover, the flux of every pair of poles of the rotor is maximized since these fluxes are collected and closed in itself through the poles of polar pieces which are directly opposite the poles of every pair of the rotor. This is a second necessary condition to obtain an optimum efficiency, and here is a third one which relates to the stepping mode of operation.

The fact that the rotor is plain, i.e. does not have any regular interval between the poles of each rotor face which would not be equal to $2\pi/N$, optimizes, from the view point of the efficiency, the relation between the total flux of the pairs of poles of the rotor and the inertia of the latter. That is due to the fact that efficiency is a function increasing with the flux and decreasing with the inertia. The power, however, to which that function increases with the flux is greater than that with which it decreases with the inertia.

The combination of these necessary conditions permits the motor according to the invention, in its complete structure, to be optimum from the view point of the efficiency. Motors of the same type which do not satisfy the conditions stated have not an optimum efficiency.

The phase number of the motor according to the invention can be very large without modifying the motor conception, since it suffices that the relation $m=N/2n$ be satisfied for n being integer. In other words, it suffices to increase the number N of poles per rotor face to increase the number m of faces.

The motor according to the invention also has the advantage offering a very large power range without having to modify the motor comcept. Without going into the details of theory, it is, indeed, intuitive to observe that the mechanical power of a motor of this type is a function increasing with the number of the pairs of poles of the rotor as well as of the diameter of the latter.

Finally, the motor according to the invention has the advantage to be able to operate step-by-step, because of the necessary positioning torque for this mode of operation, which is produced by the disk of FIG. 6.

I claim:

1. A multiphase motor comprising:

a rotor having first and second faces, each face having N/2 pairs of magnetic rotor poles distributed around the axis of rotation of said rotor, adjacent rotor poles on each face having opposite polarities, the rotor poles on the first face being directly opposite the rotor poles of the same polarity on the second face, where: N=2 mn, n being a positive integer, and m being a positive integer greater than 1;

a stator, surrounding said rotor, and having stator poles concentric to said rotor, said stator formed with m phases, each phase comprising a first and second pair of polar pieces, each pair of polar pieces comprising an internal and an external polar piece being substantially coplanar and being interpositioned one within the other and separated by a sinuous air gap, said first pair of polar pieces of each phase being substantially identical to said second pair of polar pieces and being located on opposite sides of said rotor, wherein for all polar pieces of m−1 phases, as well as for a first polar piece of each of said first and second pair of polar pieces of the remaining phase, the stator poles are full and are spaced apart by an angular interval at least approximately as large as that between adjacent rotor poles, wherein (N/2m)−1 stator poles of a second polar piece of each of said first and second pair of polar pieces of said remaining phase are full, and wherein the m remaining stator poles of said second polar piece are fractional, the sum of the angular arcs of all fractional stator poles being approximately equal to the angular arc of a full stator pole; and a core for each phase, said internal polar pieces of each phase being magnetically connected to a first end of a respective core, and said external polar pieces of each phase being magnetically connected to a second end of said respective core;

wherein each core has at least one coil wound thereon, and wherein each phase in phase shifted from all other phases.

2. A motor as recited in claim 1 wherein said phases are phase shifted with respect to each other through an angle at least approximately equal to 2π/Nm, and wherein the angular arc of every said fractional stator pole is at least approximately equal to 1/m times that of a full stator pole.

3. A motor as recited in claim 1 wherein said rotor further comprises:

two magnetized parts, each part having N magnetization axes, each being parallel to the axis of rotation of said rotor, said magnetization axes being of alternate opposite polarities and being separated from adjacent magnetization axes by equal angular intervals; and a soft ferromagnetic disk located between said two magnetized parts of said rotor, said rotor poles of one part being located directly opposite said rotor poles of the second part having the same polarity.

4. A motor as recited in claim 1 wherein the angular intervals of said rotor poles of a first face of the rotor are substantially indentical to the angular intervals of the stator poles of the stator immediately adjacent said first face, and to the angular intervals of the rotor poles of the second face of the rotor, and to the angular intervals of the stator poles immediately adjacent said second face.

5. A multiphase motor comprising:

a rotor having first and second faces, each face having N/2 pairs of magnetic rotor poles distributed around the axis of rotation of said rotor, adjacent rotor poles on each face having opposite polarities, the rotor poles on the first face being angularly displaced from the rotor poles of the same polarity on the second face, where: N=2 mn, n being a positive integer, and m being a positive integer greater than 1;

a stator, surrounding said rotor, and having stator poles concentric to said rotor, said stator formed with m phases, each phase comprising a first and second pair of polar pieces, each pair of polar pieces comprising an internal and an external polar piece being substantially coplanar and being interpositioned one within the other and separated by a sinuous air gap, said first pair of polar pieces of each phase being substantially identical to said second pair of polar pieces and being located on opposite sides of said rotor, wherein for all polar pieces of m−1 phases, as well as for a first polar piece of each of said first and second pair of polar pieces of the remaining phase, the stator poles are full and are spaced apart by an angular interval at least approximately as large as that between adjacent rotor poles, wherein (N/2m)−1 stator poles of a second polar piece of each of said first and second pair of polar pieces of the remaining phase are full, and wherein the m remaining stator poles of said second polar piece are fractional, the sum of the angular arcs of all fractional stator poles being approximately equal to the angular arc of a full stator pole; and a core for each phase, said internal polar pieces of each phase being magnetically connected to a first end of a respective core, and said external polar pieces of each phase being magnetically connected to a second end of said respective core;

wherein each core has at least one cell wound thereon, and wherein each phase is phase shifted from all other phases.

6. A motor as recited in claim 5, wherein said first pair of polar pieces of each phase are angularly offset with respect to said second pair of polar pieces of the same phase.

7. A motor as recited in claim 6 wherein the rotor poles of said first and second faces of said rotor are angularly displaced by an angle substantially equal to said angular offset of said first and second pairs of polar pieces of each phase.

8. A multiphase motor comprising:

a rotor having first and second faces, at least one face having N/2 pairs of magnetic rotor poles distributed around the axis of rotation of said rotor, adjacent rotor poles having opposite polarities, where: N=2 mn, n being a positive integer, and m being a positive integer greater than 1;

a stator, adjacent said rotor, and having stator poles concentric to said rotor, said stator formed with m phases, each phase comprising at least one pair of polar pieces, each pair of polar pieces comprising an internal and an external polar piece being substantially coplanar and being interpositioned one within the other and separated by a sinuous air gap, wherein for all polar pieces of m−1 phases, as well as for a first polar piece of each of said at least one pair of polar pieces of the remaining phase, the stator poles are full and are spaced apart by an angular interval at least approximately as large as that between adjacent rotor poles, wherein for (N/2m)−1 stator poles of a second polar piece of each of said at least one pair of polar pieces of the remaining phase are full, and wherein the m remaining stator poles of said second polar pieces are fractional, the sum of the angular arcs of all fractional stator poles being approximately equal to the angular arc of a full stator pole; and a core for each phase, said internal polar piece of each phase being magnetically connected to a first end of a respective core, and said external polar piece of each said phase being magnetically connected to a second end of said respective core;

wherein each core has at least one coil wound thereon, and wherein each phase is phase shifted from all other phases.

9. A motor as recited in claim 7, wherein said stator is adjacent to only one face of said rotor, and wherein a soft ferromagnetic disk is located coaxial with said rotor and adjacent to a rotor face opposite said rotor face adjacent to said stator.

10. A motor as recited in claim 8, wherein the rotor poles of said first face of said rotor are angularly displaced with respect to said rotor poles of said second face of said rotor.

11. A motor as recited in claim 9, wherein said soft ferromagnetic disk includes N apertures regularly distributed concentric to said disk and angularly aligned with radial segments of said sinuous air gap of said stator.

12. A motor as recited in claim 9, wherein said soft ferromagnetic disk has N/2 apertures regularly distributed concentric to said disk, and angularly aligned with radial segments of said sinuous air gap of said stator.

13. A motor as recited in claim 9, wherein said soft ferromagnetic disk has N apertures regularly distributed concentric to said disk and angularly offset with respect to radial segments of said sinuous air gap of said stator.

14. A motor as recited in claim 9, wherein said soft ferromagnetic disk is provided with N/2 apertures regularly distributed concentric to said disk and angularly offset with respect to radial segments of said sinuous air gap of said stator.

15. A motor as recited in claims 1 or 5 wherein, for each phase, said first pair of polar pieces is connected to said second pair of polar pieces by four threaded feet and wherein the spacing between said first pair of polar pieces and said second pair of polar pieces is provided by shoulders surrounding a first two of said four threaded feet, and by spacers surrounding the other two of said threaded feet.

* * * * *